(12) United States Patent
Roberston et al.

(10) Patent No.: US 9,846,663 B2
(45) Date of Patent: Dec. 19, 2017

(54) METHOD OF CONTROLLING DIRECT MEMORY ACCESS OF A PERIPHERAL MEMORY OF A PERIPHERAL BY A MASTER, AN ASSOCIATED CIRCUITRY, AN ASSOCIATED DEVICE AND AN ASSOCIATED COMPUTER PROGRAM PRODUCT

(71) Applicants: Alistair Roberston, Glasgow (GB); Carl Culshaw, Wigan (GB); Alan Devine, Paisley (GB)

(72) Inventors: Alistair Roberston, Glasgow (GB); Carl Culshaw, Wigan (GB); Alan Devine, Paisley (GB)

(73) Assignee: NXP USA, Inc., Austin, TX (US)

( * ) Notice: Subject to any disclaimer, the term of this patent is extended or adjusted under 35 U.S.C. 154(b) by 136 days.

(21) Appl. No.: 14/778,115

(22) PCT Filed: Mar. 22, 2013

(86) PCT No.: PCT/IB2013/052299
§ 371 (c)(1),
(2) Date: Sep. 18, 2015

(87) PCT Pub. No.: WO2014/147448
PCT Pub. Date: Sep. 25, 2014

(65) Prior Publication Data
US 2016/0070666 A1    Mar. 10, 2016

(51) Int. Cl.
*G06F 13/28* (2006.01)
*G06F 13/364* (2006.01)
*G06F 13/42* (2006.01)

(52) U.S. Cl.
CPC ............ *G06F 13/28* (2013.01); *G06F 13/364* (2013.01); *G06F 13/4282* (2013.01)

(58) Field of Classification Search
CPC ...................................................... G06F 13/28
See application file for complete search history.

(56) References Cited

U.S. PATENT DOCUMENTS

| 5,809,278 | A  | * | 9/1998 | Watanabe ............... G06F 13/18 345/532 |
|---|---|---|---|---|
| 6,532,511 | B1 |   | 3/2003 | Brooks |
| 6,594,713 | B1 |   | 7/2003 | Fuoco et al. |
| 7,689,733 | B2 |   | 3/2010 | Carpenter et al. |

(Continued)

FOREIGN PATENT DOCUMENTS

KR    1020070061240    6/2007

OTHER PUBLICATIONS

International Search Report and Written Opinion correlating to PCT/IB2013/052299 dated Dec. 19, 2013.

(Continued)

*Primary Examiner* — Tammara Peyton (57) ABSTRACT

A method of controlling direct memory access of a peripheral memory of a peripheral by a master is described. The method includes checking whether there is a pending request from the peripheral for a direct memory access service, establishing whether an access condition is satisfied in dependence on at least whether there is a pending request, and, if the access condition is satisfied, granting access to the master. Also, an associated device and an associated computer program product are described.

15 Claims, 6 Drawing Sheets

(56) References Cited

U.S. PATENT DOCUMENTS

2002/0169908 A1 11/2002 Shiraga
2002/0194441 A1 12/2002 Chauvel et al.
2007/0174507 A1 7/2007 Conti

OTHER PUBLICATIONS

Andreas Schranzhofer, Jian-Jia Chen, and Lothar Thiele, "Timing Predictability on Multi-Processor Systems with Shared Resources", Embedded Systems Week—Workshop on Reconciling Performance with Predictability, 2009.

Jan Nowotsch, Michael Paulitsch, Daniel Buehler, Henrik Theiling, Simon Wegener, Michael Schmidt, "Monitoring-Based Resource Separation on Commercial Multi-core SoCs", draft paper distributed by Michael Schmidt on Aug 10, 2012 on an email list of the public founded project "ARAMiS—Automotive, Railway and Avionics Multicore Systems" to participants from different companies.

* cited by examiner

METHOD OF CONTROLLING DIRECT MEMORY ACCESS OF A PERIPHERAL MEMORY OF A PERIPHERAL BY A MASTER, AN ASSOCIATED CIRCUITRY, AN ASSOCIATED DEVICE AND AN ASSOCIATED COMPUTER PROGRAM PRODUCT

FIELD OF THE INVENTION

This invention relates to a method of controlling direct memory access of a peripheral memory of a peripheral by a master, an associated circuitry, an associated device and an associated computer program product.

BACKGROUND OF THE INVENTION

There is a continued demand for enhanced levels of safety related features within devices, such as microcontrollers, having one or more masters and one or more peripherals. Currently microcontrollers implement several layers of protection between the masters and the peripherals, particularly those affecting device Input/Output (I/O) directly. Current designs have protection through, for example, the use of user/supervisor level access rights, address range based protection through a Memory Protection Unit (MPU) and a Memory Management Unit (MMU), Master ID protection, and Process ID based protection. For example, U.S. Pat. No. 7,689,733 B2 describes a computer that operates in a metered mode for normal use and a restricted mode uses an input/output memory management unit (I/O MMU) in conjunction with a security policy to determine which peripheral devices are allowed direct memory access during the restricted mode of operation. U.S. Pat. No. 7,689,733 B2 describes that during restricted mode operation, non-authorized peripheral devices are removed from virtual address page tables or given vectors to non-functioning memory areas. However, known schemes may not always be sufficiently satisfactory. Safety concerns remain, such as erroneous operation of internal circuitry which may affect I/O in an unexpected and undesired manner. For example, a random soft error may cause disruption and potentially affect I/O and a continued wish for enhanced level of safety against unwanted behaviour persists. Current designs may still be compromised due to, for example, an access by a non-CPU master to areas of the device that may directly affect I/O, or an access that is not intended to occur but that results from a random soft error.

SUMMARY OF THE INVENTION

The present invention provides a method of controlling direct memory access of a peripheral memory of a peripheral by a master, a circuitry, a device and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

Figure 1:
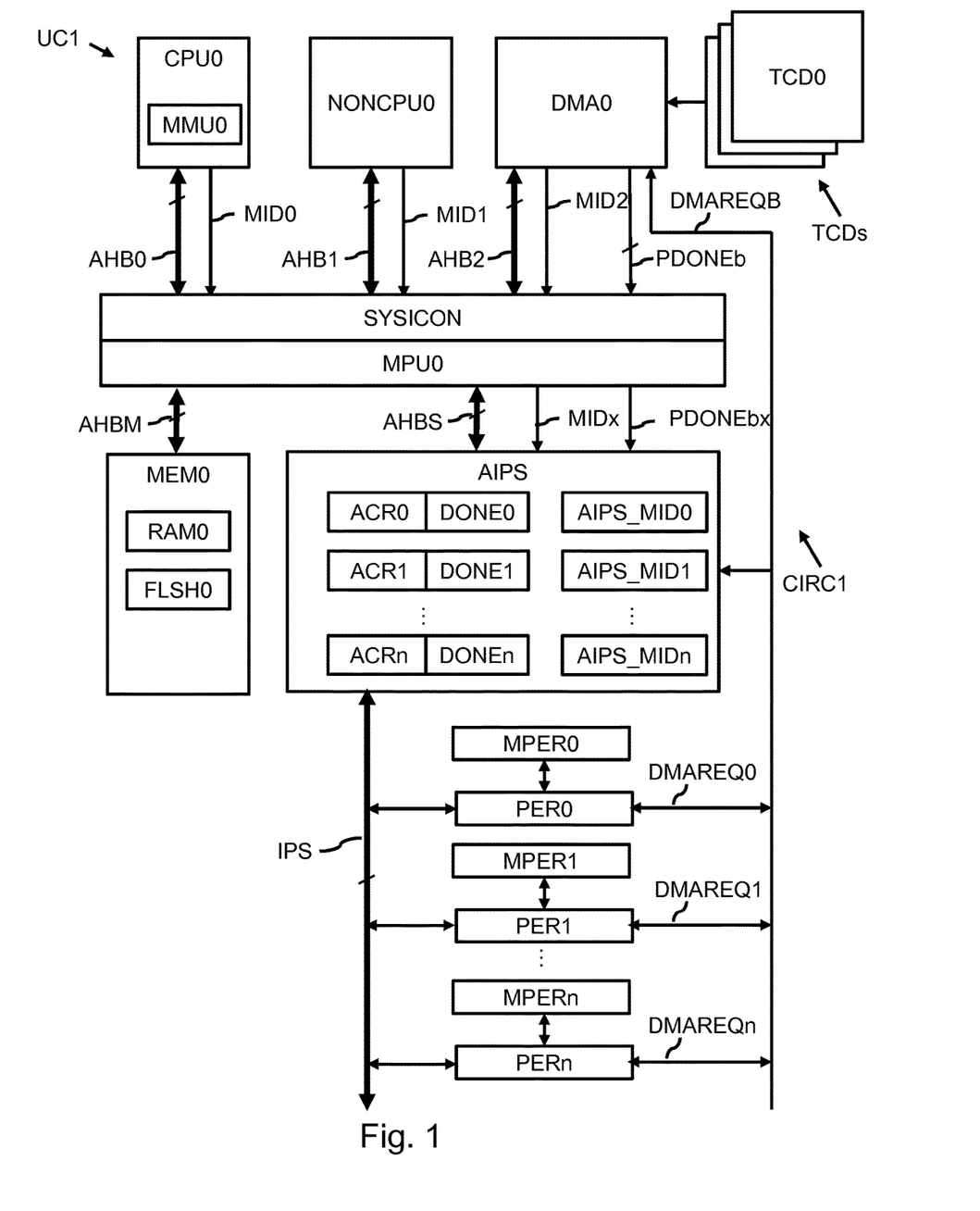
FIG. 1 schematically shows a microcontroller having one or more masters, one or more peripherals, and an access control circuitry.

FIG. 1 schematically shows a device, in this example a microcontroller UC1, comprising a circuitry having one or more masters CPU0, NONCPU0, DMA0, one or more peripherals PER0, PER1, PER2, an access control circuitry CIRC1 and a system memory MEM0. The access control circuitry CIRC1 comprises a system interconnect circuitry SYSICON, a memory protection unit (MPU) MPU0 and a bus interface AIPS. The access control circuitry CIRC1 is arranged to provide an interface between the one or more masters CPU0, NONCPU0, DMA0 and the one or more peripherals PER0, PER1, PER2. The peripherals may be memory-mapped peripherals, i.e., with the peripherals being controlled with parameters settings in memory, such as in a random-access memory or in one or more registers. The memory may be physically implemented as, for example, a private memory, or have an allocated space in a common memory. The peripheral PER0 may e.g. be a Controller Area Network (CAN)-bus interface CAN_IF arranged to interface to one or more CAN devices CAN_DEV over a CAN-bus, and arranged to send and/or receive data over the CAN-bus. Such CAN device may e.g. be an active node on a vehicle network. The peripherals PER0 may alternatively or additionally e.g. comprise a Local Interconnect Network (LIN)-bus interface LIN_IF arranged to interface to one or more LIN devices LIN_DEV over a LIN-bus, and may be arranged to send and/or receive data over the LIN-bus. Such LIN-bus device may e.g. be a slave device in a vehicle network. The peripherals PER0, PER1, PER2 may e.g. comprise a General Purpose I/O (GPIO) interface arranged to connect directly to external devices via general purpose Input/Output (I/O) pins. The peripherals PER0, PER1, PER2 may e.g. comprise an Analogue-to-Digital Convertor (ADC) arranged to measure a signal level of an analogue signal, such as the output from a sensor within the vehicle, and to convert the measure into a digital value, allowing one of the masters, e.g. CPU CPU0 to further process it. The peripherals may e.g. comprise one or more timers. Timers may for example be arranged to provide a measurement of time between a start moment and a stop moment and to provide the measurement to another unit of the microcontroller UC1, such as one of the masters CPU0, NONCPU0 or to indicate this measurement on an output pin of the microcontroller UC1. Hereto, a timer may be started and stopped by one of the masters CPU0, NONCPU0. The timer may e.g. be used to generate a sequence of pulses on a pin to flash an indicator light in a vehicle at a defined rate.

The three masters in FIG. 1 are shown as shown as a central processing unit (CPU), a non-CPU master NON- CPU0, and a direct memory access controller DMA0. The term non-CPU master NONCPU0 may refer to a master that is not a CPU but that comprises alternative logic circuitry capable of initiating a bus transfer, such as a read and/or write of an address or memory mapped portion of a system slave's address range. A master non-CPU master NONCPU0 may thus, e.g., be an Ethernet controller, a Flexray controller, or a hardware security module (HSM).

The access control circuitry CIRC1 is arranged to control access by the masters of the one or more masters to the peripherals of the one or more peripherals. Herein the term access may relate to an access by a master to a peripheral's memory or register space.

Hereto, at least one of the masters is arranged to, when access is granted by the access control circuitry CIRC1, access at least one of the peripherals via the access control circuitry. For example, CPU CPU0 may be arranged to cooperate with peripheral PERn, when access to peripheral PERn is granted to CPU CPU0, while, for example, master NONCPU0 may be arranged to cooperate with peripheral PER1, when access to peripheral PER1 is granted to master NONCPU0.

At least one peripheral of the one or more peripherals is arranged to allow access to the peripheral by at least one master of the one or more masters, if the access control circuitry CIRC1 allows access. For example, peripheral PERn may be arranged to allow access to itself and to its associated memory range MPER0 by CPU CPU0. Peripheral PERn may hereto be arranged to request a direct memory access service from the DMA controller DMA0. The access control circuitry CIRC1 may be arranged to control direct memory access of the peripheral memory MPERn of peripheral PERn by a master, by being arranged to check whether there is a pending request from the peripheral for a direct memory access service and to establish whether an access condition is satisfied in dependence on at least whether there is a pending request. If the access condition is satisfied, granting access to the master. If the access condition is not satisfied, access is denied.

The access control circuitry CIRC1 may be arranged to signal the at least one master that an access can be performed where access is granted by, for example, providing one or more master interrupt signals to the at least one master. Herein, the access control circuitry CIRC1 may be arranged to signal the at least one master that an access can be performed where access is granted. The access control circuitry CIRC1 may provide the interrupt signal directly to the accessing master, or via the DMA controller DMA0.

The access control circuitry CIRC1 may be further be arranged to establish whether the access condition is satisfied in dependence on whether a specific master that wants to access a specific peripheral is actually allowed to access the specific peripheral. Hereto, the access control circuitry CIRC1 may be further be arranged to establish a master ID associated with the master, to compare the master ID with a pre-established master ID to obtain an master comparison result, and to establish whether the access condition is satisfied in further dependence on at least the master comparison result. The access control circuitry CIRC1 may be arranged to, at least during normal operation establishing the master ID from receiving the master ID from the master. Unexpected and unauthorized accesses by other devices than the master having the pre/established master ID may hereby be largely prevented. Hereto, the access control circuitry CIRC1 of the exemplary embodiment shown in FIG. 1 comprises logic in the bus interface AIPS which indicates that master CPU CPU0 is allowed to access peripheral PERn using an internal register AIPS_MIDn, set to the master ID value of master CPU0.

The microcontroller UC1 further comprises one or more high speed system busses, such as Advanced High Speed Busses (AHB) AHB0, AHB1, AHB2, AHBM and a system interconnect SYSICON. The system interconnect SYSICON may also be referred to as a system cross bar SYSICON. The high speed system busses AHB0, AHB1, AHB2 and AHBM connect masters CPU0, NONCPU0, DMA0 and system memory MEM0 to the system interconnect SYSICON. The system interconnect SYSICON is arranged to arbitrate between these busses to provide an interface between the high speed system busses AHB0, AHB1, AHB2 and AHBM on one side of the system interconnect SYSICON and a single high speed system bus AHBS at the other side of the system interconnect SYSICON.

The access control circuitry CIRC1 may comprise a bus interface, such as an AHB-to-IPS bus interface AIPS. The AHB-to-IPS bus interface AIPS may further also be referred to with the more general term bus interface, or with the term bus gasket. The AHB-to-IPS bus interface AIPS is connected to the system interconnect SYSICON via high-speed system bus AHBS and to a a low bandwidth Inter Peripheral Bus IPS that connects to and between all the peripherals PER0, PER1, PER2 like communications modules, timers, general purpose I/O, etc. The bus interface AIPS is arranged to convert between the single high-speed system bus AHBS and the bandwidth Inter Peripheral Bus IPS. The bus interface AIPS may further comprise a register interface that can be programmed to restrict access to peripheral memory address ranges based upon attributes of the bus transfer, such as a master ID. For example, the microcontroller UC1 may hereby be configured such that a specific CPU is the only master that has access to read/write the memory address range of a specific module, by indicating allowable master IDs in registers AIPS_MID0, . . . , AIPS_MIDn for the respective peripherals PER0, . . . , PERn. Similarly may the microcontroller may hereby be configured such that a specific process is the only process that has access to read/write the memory address range of a specific slave peripheral module, for example by indicating allowable process IDs in further registers of the bus interface AIPS. For example, one of the masters may be running a given process at a given time and have an internal register that can be written by the CPU to signal which process is running using a process ID. This register, and the contents of it, may be routed to the rest of the microcontroller as a process ID signal. This then means that other logic in the system (i.e. system slaves, system interconnects, system memory protection units) may use these process ID signals to identify the process ID that is running when performing the access and optionally apply any access restrictions.

The bus interface AIPS may further cooperate with or comprise a memory protection unit MPU MPU0. The MPU MPU0 is capable of partitioning the memory map of the microcontroller into defined regions and setting individual protection attributes for each region. The MPU MPU0 may reside within or close to the system interconnects (or crossbar or switch fabric) SYSICON as shown in FIG. 1. The MPU MPU0 may alternatively reside inside the bus gasket AIPS. The MPU may hereby be capable of applying attributes to multiple masters within the system.

The CPU CPU0 may comprise a memory management unit (MMU) MMU0 as shown in FIG. 1. The MMU may be similar to the MPU in terms of its capability to apply protection attributes to memory map address regions but differs in that it may be resident within the core, or the core's local circuitry, whereby the attribute that it applies to memory accesses may only be applied to that individual core. Further, a MMU may be capable to perform 'address translation' from translating a virtual address to a physical address, and thus effectively remap from one address space to another address space.

FIG. 1 schematically indicates that the masters CPU0, NONCPU0 and DMA0 may provide the respective master IDs MID0, MID1, MID2 via the system interconnect SYSICON and MPU MPU0 to the bus interface AIPS. This allows the bus interface AIPS to establish whether the access condition for a specific master to access a specific peripheral PERm (m=0, . . . , n) is satisfied in further dependence on the master comparison result derived from comparing the master ID associated with an access to one or more allowable master IDs in registers AIPS_MIDm for the specific peripheral PERm.

FIG. 1 further shows that the peripherals PER0, . . . , PERn are arranged to provide respective DMA request signals DMAREQ0 DMAREQ1, . . . , DMAREQn. The DMA request signals DMAREQ0 DMAREQ1, . . . , DMAREQn may, as schematically be indicated in FIG. 1, be provided to a DMA request bus DMAREGB, but could alternatively be provided in any other suitable way, such as for example as interrupt signals. The DMA request signals DMAREQ0 DMAREQ1, . . . , DMAREQn provide signals from the respective peripheral (PER0, . . . , PERn) indicating that the peripheral either has data ready to be copied from the peripheral to another location, such as a buffer in system RAM, or that peripheral requires data to be copied to the peripheral (into the peripherals local memory MPER0, . . . , MPERn), typically data to be transmitted or command data indicating an operation to perform. Thus in an embodiment, the DMA request signals DMAREQ0 DMAREQ1, . . . , DMAREQn thus indicate whether the respective peripheral is requesting a direct memory access to its memory MPER0, . . . , MPERn. The peripherals may be arranged to establish the DMA request signal to indicate that the peripheral itself has data available, e.g. in response of an external signal delivered to the peripheral. For example, peripheral PER0 may be an Analogue-to-Digital Convertor (ADC) arranged to measure a signal level of an analogue signal, such as the output from a sensor within the vehicle, and to convert the measure into a digital value, and the ADC may establish the DMA request to signal that the digital value is stored in its local memory MPER0 and is ready for transfer to a different memory mapped location. The peripherals may additionally or alternatively be arranged to establish the DMA request signal to indicate that the peripheral requires data to be written into its local memory via a direct memory access, e.g., where the peripheral comprises a transmitter expecting data from the system for transmission. For example, a peripheral responsible for message transmission may operate with a First In First Out (FIFO) command buffer arranged to contain one or more commands for the peripheral. For example, a Serial Peripheral Interface (SPI) typically has a FIFO that is filled with commands instructing the SPI to send data in a certain format with a certain data payload. If the SPI is enabled, but the FIFO is empty, then the SPI can signal to the system that it requires a command to be written to the FIFO. Prior art systems typically use interrupt signals for signalling a CPU to hereby request the requested to copy the commands from memory to the peripheral. This may be computationally intensive and intrusive to the application. It may thus be more efficient and/or less intrusive to use a suitable configured DMA, e.g. configured, by virtue of writing appropriate configuration data to the DMA's TCD associated with the DMA channel associated with the SPI's FIFO, with the SPI being arranged to indicate to the DMA by means of a DMA request that it requires commands transferred into its FIFO.

In embodiments, a peripheral may be arranged to maintain this signal until it is being reset by the DMA controller DMA0. In alternative embodiments, a peripheral may be arranged to provide the DMA request signal as a pulse, or to clear the request upon a commencement of a transfer. In these alternative embodiments, the bus interface AIPS may be arranged to latch the DMA request signal, for example as long as the transfer has not yet been completed or until the latch gets reset by a signal indicating that the transfer has been completed; an exemplary embodiment of circuitry to provide this latching is shown in FIG. 2b.

The system memory MEM0 may comprise one or more random accessible memories RAM0 and/or one or more flash memories FLSH0 and/or any other volatile and/or non-volatile memories.

The DMA controller DMA0 is a bus master capable of reading and writing the memory map of the device. The DMA controller DMA0 reads records that a user may program to a local RAM memory to indicate to the DMA controller DMA0 what operations the DMA controller DMA0 may perform. For example, the records may indicate type and size of data transfers, fetch addresses, destination addresses, etc. The records may be stored in so-called Transfer Control Descriptors TCDs. For example a 16 channel DMA may have 16 TCDs, TCD0, . . . , TCD15.

The DMA controller DMA0 is further arranged to generate a plurality of signals PDONE0, . . . , PDONEn, together referred to as PDONEb, to indicate for each peripheral PER0, . . . , PERn whether DMA service request are being serviced at the time or not. In the example, the signals PDONE0, . . . , PDONEn are high when a DMA service request is completed ("done") and low when a DMA service request is in progress. The DMA controller DMA0 may hereby signal to, for example, the bus interface AIPS, which direct memory accesses are being performed to the peripherals. In FIG. 1, the plurality of signals PDONE0, . . . , PDONEn indicating for each peripheral PER0, . . . , PERn whether DMA service request are being serviced at the time or not as provided to the system interconnect SYSICON are together indicated with reference symbol PDONEb, and the corresponding signals are indicated with reference signal PDONEbx between the system interconnect SYSICON and the bus interface AIPS. In the rest of this document, the same reference signal, PDONEb, will be used for both physical signals in order not to obscure the description. The skilled person will appreciate that the PDONeb and PDONEbx signals may be exactly the same, or may have another 1:1 relationship.

The bus interface AIPS comprises a plurality of access attribute registers for each of the peripherals PER0, . . . , PERn. FIG. 1 shows that for each peripheral PER0, . . . , PERn, the bus interface comprises an associated, user programmable, access control register ACR0, ACR1, . . . , ACRn as is known in the art. The access control registers ACR0, ACR1, . . . , ACRn indicate for example whether a specified peripheral is to be accessed by a defined master, and what access types such as read and/or write are permitted. Further, for each peripheral PER0, . . . , PERn, the bus interface comprises an associated register field DONE0, DONE1, . . . , DONEn, storing the current values of the plurality of signals PDONE0, . . . , PDONEn generated by the DMA controller DMA0. The register fields DONE0, DONE1, ..., DONEn may be additional fields to the access control register ACR0, ACR1, ..., ACRn, or may be provided as separate registers. The DONE0, DONE1, ..., DONEn registers may be write-until-reset registers, of which the contents remains locked and cannot be modified until the DMA controller DMA0 resets the respective register. The bus interface AIPS further comprises a plurality of registers AIPS_MID0, AIPS_MID1, ..., AIPS_MIDn to specifying which system master(s) has access to which peripheral. The registers AIPS_MID0, AIPS_MID1, ..., AIPS_MIDn may be configured as system startup to permit DMA access by specific masters to specific peripherals.

The microcontroller UC may be utilized in safety related microcontrollers, such as for example in powertrain, safety/chassis and body applications for automotive, as well as, for example, medical and aerospace applications.

Figure 2A:
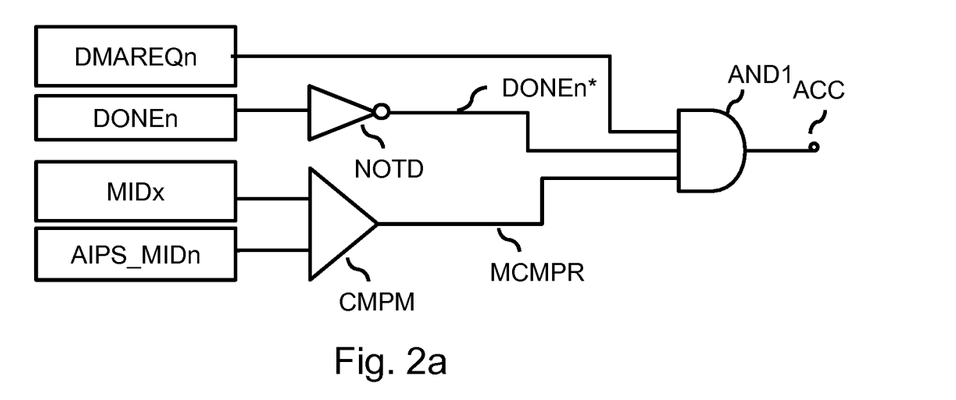
FIG. 2a and FIG. 2b schematically show embodiments of a part of the access control circuitry.
Figure 2B:
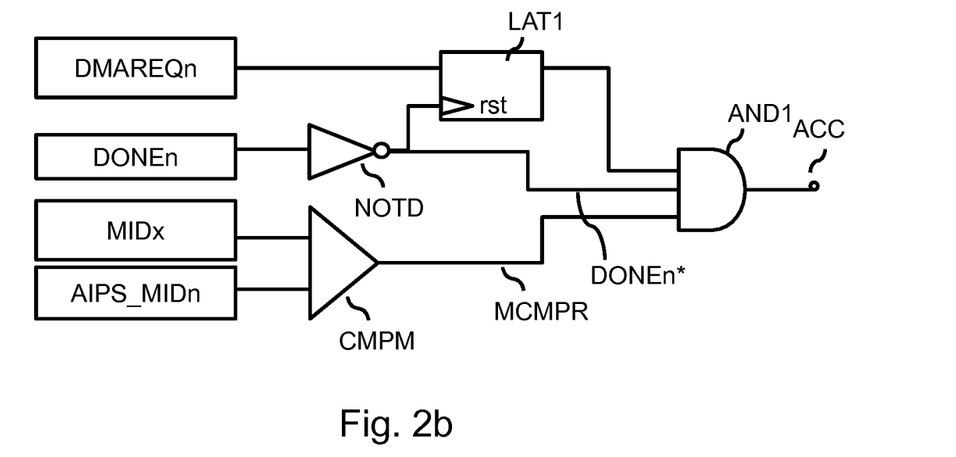

FIG. 2a and FIG. 2b schematically shows embodiments of a part of the access control circuitry CIRC1 of FIG. 1 or of exemplary alternative embodiments of an access control circuitry. FIG. 2a and FIG. 2b will be described below when describing FIG. 3 in combination with FIG. 1.

Figure 3:
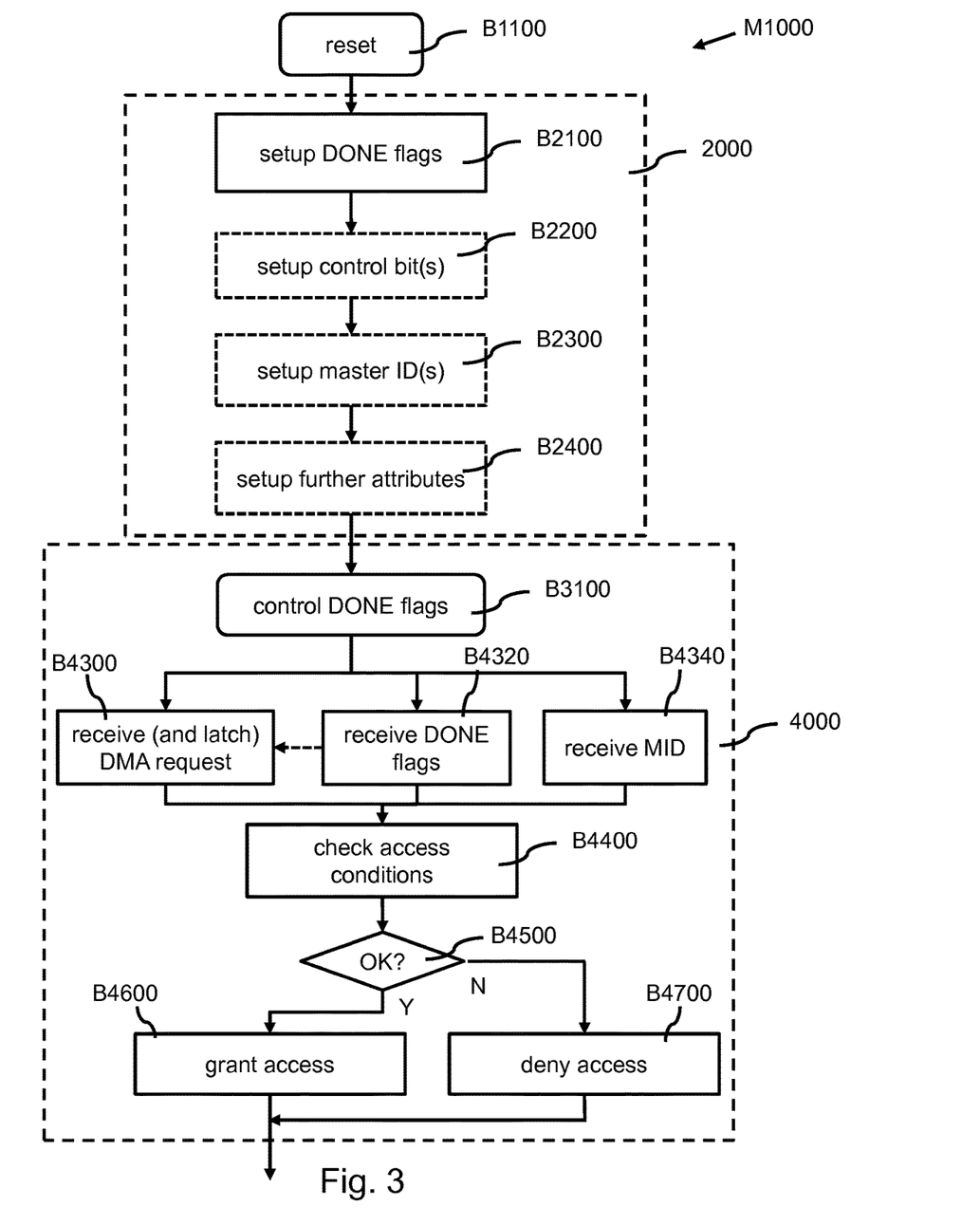
FIG. 3 schematically shows a method of access control.

FIG. 3 schematically shows a method M1000 that may be performed by the access control circuitry CIRC1 of FIG. 1 in cooperation with the DMA controller DMA0 of FIG. 1, or by alternative embodiments of an access control circuitry and/or DMA controller. The method is described below with reference to FIG. 3 in combination with FIG. 1 and FIG. 2a and FIG. 2b, without being limited to the embodiment shown in FIG. 1 and/or FIG. 2a and FIG. 2b. The method M1000 may be utilized in safety related microcontrollers, such as for example in powertrain, safety/chassis and body applications for automotive, as well as, for example, medical and aerospace applications.

The method M1000 comprises a reset stage B1100, a setup stage 2000 and an access control stage 4000.

In the reset stage B1100, all registers and memories may be cleared from their content. The setup stage 2000 comprises setting up B2100 indicators, further also referred to as DONE flags, to initial values to indicate that no DMA service requests are being handled (i.e., no DMA requests are pending) by initializing PDONEb signals to indicate so and by initializing the DONE0, DONE1, ..., DONEn registers with The setup stage 2000 further comprises setting up B2200 control bits in the bus interface AIPS, in particular initializing the access control registers ACR0, ACR1, ..., ACRn to appropriate values. The setup stage 2000 further comprises setting up B2300 master IDs, which comprises assigning master IDs to each master or by retrieving pre-defined master IDs from the masters and initializing registers AIPS_MID0, AIPS_MID1, ..., AIPS_MIDn to specifying which master has access to which peripheral module. The setup stage 2000 may further comprises setting B2400 further attributes, such as initializing registers in the DMA controller DMA0 with information as stored in the Transfer Control Descriptors TCD and, for example, initializing one or more of the peripherals with suitable register settings.

After the reset stage 2000, the method proceeds to the access control stage 4000. The access control stage 4000 comprises controlling B3100 the DONE flags. Hereto, the method may comprise, by the DMA controller DMA0, establishing an indicator to indicate that a request is pending upon receiving a request from the peripheral for a direct memory access service and establish the indicator to indicate that the request is no longer pending upon completion of the direct memory access service.

The method may further comprise, by the access control circuitry AIPS, receiving the indicator for using the indicator to check whether there is a pending request from the peripheral for a direct memory access service. The indicator may be established by the DMA controller DMA0 as one of the signals PDONE0, ..., PDONEn, and stored in the access control circuitry AIPS as one of the registers DONE0, ..., DONEn. Checking whether there is a pending request from the peripheral for a direct memory access service by the access control circuitry AIPS may comprise checking whether the peripheral made a request for the direct memory access service and checking whether the direct memory access service requested by the peripheral has not yet been completed.

In the following, further reference will be made to the registers DONE0, ..., DONEn as the indicators indicating that a request is pending and these registers will be used in the further stages. However, as the skilled person will appreciate based on the description given, in alternative embodiments, the associated signals PDONE0, ..., PDONEn may be used directly.

The access control stage 4000 further comprises receiving B4300 a DMA request from a peripheral PERn of the plurality of peripherals, receiving B4320 the associated signal PDONEn indicating whether the request is pending or retrieving the corresponding register value DONEn, and receiving B4340 a master ID of the master for access.

The access control stage 4000 further comprises checking B4400 access conditions in dependence on at least whether there is a pending request. The method comprises establishing B4500 whether an access condition is satisfied in dependence on at least whether there is a pending request. The method further comprises, if the access condition is satisfied, granting B4600 access to the master, and, if the access condition is not satisfied, denying B4700 access to the master.

Figure 4:
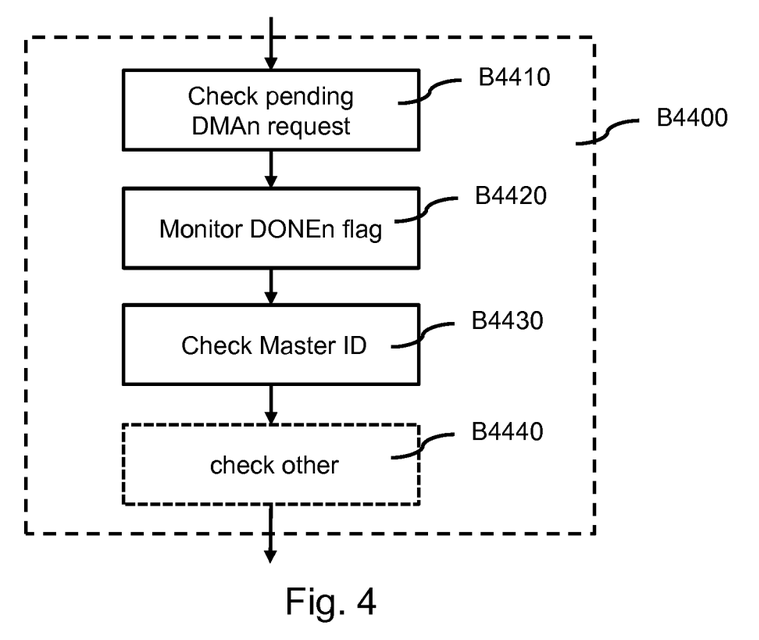
FIG. 4, FIG. 5 and FIG. 6 show embodiments of stages of the method.

The checking B4400 access conditions as shown in FIG. 4, stage B4410, B4420 and B4430 may be performed using a circuit as schematically shown in FIG. 2a, or, in alternative embodiments, using a circuit as schematically shown in FIG. 2b.

FIG. 2a shows a circuit part of the access control circuitry AIPS. The circuit part comprises a logical AND circuit AND1 and a logical NOT circuit NOTD. The logical NOT circuit NOTD is arranged to receive the indicator DONEn, or PDONEn, as established by the direct memory access controller DMA0 on its input and to provide a NOT-version DONEn* of the indicator on its output. The logical AND circuit AND1 is arranged to receive a request DMAREQn from the peripheral for a direct memory access on one of its inputs and the NOT-version of the indicator DONEn* on another of its inputs so as to obtain an indicator of an active pending request on its output. As shown in FIG. 2a, the circuit part may further comprise a comparator CMPM arranged to receive a master ID MIDx associated with the master associated with the memory access and a pre-established master ID AIPS_MIDn indicating which master is allowed to access the peripheral PERn. The comparator CMPM is arranged to compare the master ID MIDx with the pre-established master ID AIPS_MIDn to obtain a master comparison result MCMPR. The master comparison result MCMPR may be a high level signal where the master ID MIDx is equal to the pre-established master ID AIPS_MIDn, or, if there is a plurality of pre-established master IDs for peripheral PERn, if the master ID matches one of the plurality of pre-established master IDs, and a low-level signal when the master ID MIDx does not match. The master comparison result MCMPR is provided to a further input of the logical AND circuit AND1. The logical AND circuit AND1 may thus obtain an AND of the request DMAREQn, the NOT-version of indicator DONEn* and the master comparison MCMPR result to hereby obtain a logical value indicating whether the access condition is satisfied or not.

As shown in FIG. 2b, the circuit part may in a further embodiment also comprise a latch circuit LAT1. The latch circuit LAT1 is arranged to receive the request from the peripheral PEn, directly or via the DMA controller DMA0 for storing its value in the latch circuit LAT1. This allows memorizing that a request was issued by the peripheral, also if the peripheral PERn cleared the request after having started the direct memory access or when the request is a pulse signal. The method thus comprises, in checking whether there is a pending request from the peripheral for a direct memory access service, receiving a request from the peripheral for a direct memory access service and latching the request until a latch reset is performed.

The latch circuit LAT1 may have a reset input rst, allowing performing the latch reset after an execution of the direct memory access service associated with the request has been completed. In particular may the latch reset be performed by the indicator DONEn changing from indicating that a request is pending to indicating that the request is no longer pending. Hereto, the output of the logical NOT circuit NOTD may be connected to the reset input rst of the latch circuit LAT1, as shown in FIG. 2b.

Thus, effectively, access to the memory map of a peripheral by a master is gated with a pending DMA request and only granted when a DMA request is pending. Further, upon granting of access, the access rights may be revoked upon completion of the DMA transfer. The completion of the DMA transfer may be signalled by exporting the indicator DONEn from the DMA to the access control circuitry AIPS part of the bus interface AIPS to be stored in a register (also indicated as DONEn in FIG. 1), such as an additional field part of an extended access control register ACRn, DONEn, or as a separate register DONEn. In particular where non-CPU access may be required to a certain areas of the memory map for only a small fraction over time, the peripheral may be provided with an improved level of protection against any unwarranted DMA transfers.

Thus, whereas in prior art approaches, the DMA may be able to access a peripheral at any time which may erroneous transfers due to for example random soft errors, embodiments may effectively restrict such accesses to a limited window in time, which may reduce the opportunity for erroneous transfers to/from the peripheral. So for example in an exemplary system, where DMA accesses to specific peripherals may be expected in, for example, about 2% of the execution time of the system, embodiments may reduce the opportunity for erroneous transfers from 100% of the execution time to around 2% of the execution time and hereby provide an improved level of protection against any against erroneous transfers due to such random soft errors.

FIG. 4 schematically shows an embodiment of checking B4400 access conditions in dependence on at least whether there is a pending request. As shown in FIG. 4, checking B4400 access conditions may comprise checking B4410 whether there is a pending request from the peripheral for a direct memory access service using the DMA request as received, monitoring M4420 the associated signal PDONEn or register value DONEn, checking B4430 the master ID as received against the pre-determined master ID(s) allowed to access the peripheral AIPS_MIDn, and, in further embodiments, checking B4440 further criteria such as e.g. defined by the associated access control register ACRn.

Figure 5:
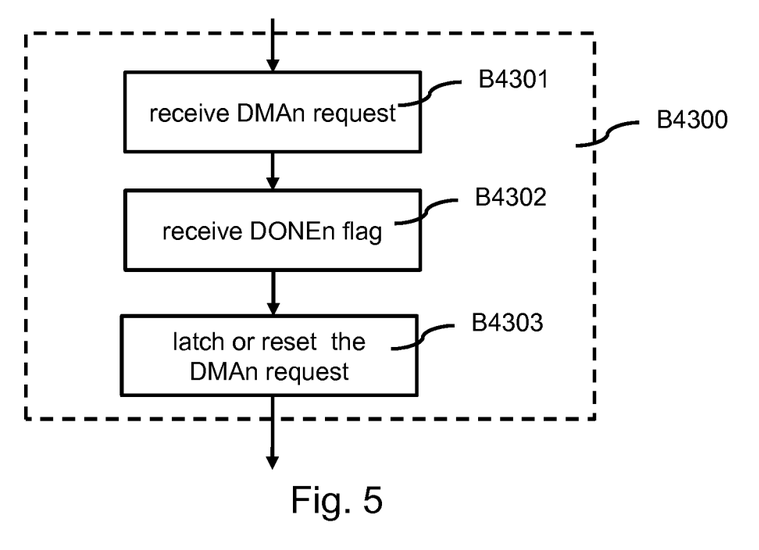

FIG. 5 schematically illustrates an embodiment of receiving B4300 a DMA request from a peripheral PERn of the plurality of peripherals. FIG. 5 shows that receiving B4300 the DMA request may comprise receiving B3401 a request from the peripheral PERn for a direct memory access service, receiving B4302 an indicator DONEn indicating whether a DMA service request for the peripheral PERN is being handled, and latching B4303 the request until a latch reset is performed in dependence on the indicator DONEn as received.

The method may further comprise using a change of the indicator from indicating that a request is pending to indicating that the request is no longer pending as a reset signal for performing the latch reset after an execution of the direct memory access service associated with the request has been completed.

Figure 6:
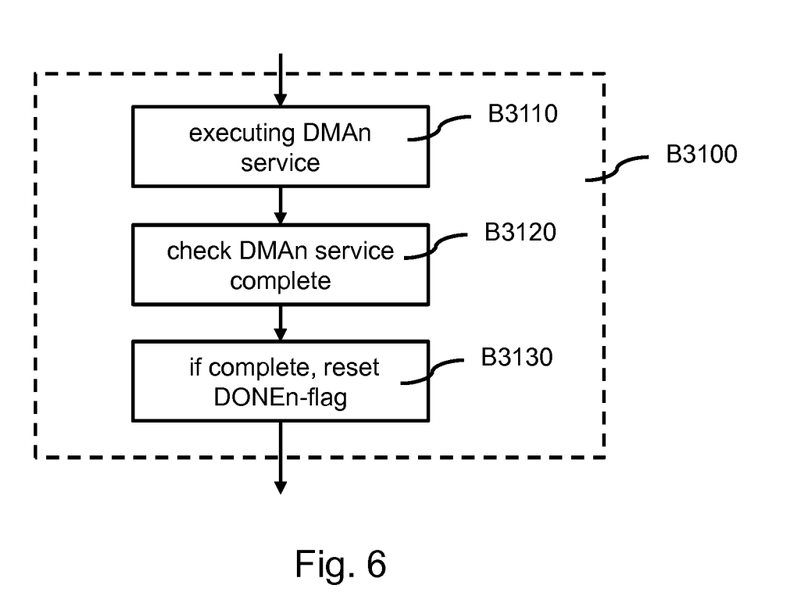

FIG. 6 schematically an embodiment of controlling B3100 the DONE flags. Hereto, the method may comprise, for example by the DMA controller DMA0, executing B3110 a DMA service after having received a request from the peripheral for a DMA service and after the DONE flags hare initialized to indicate that a request is pending, checking B3120 whether the DMA service is completed, and, if the DMA service is completed, resetting B3130 the DONE flags. Hereby, the DONE flags are controlled to indicate whether a request from the peripheral PERn for a direct memory access service is pending or not, whereby the DONE flag provide an indicator thereof.

In a further embodiment, one or more of Transfer Control Descriptors TCDs comprise respective control flags indicating whether a direct memory access to a peripheral is to be controlled in dependence on a request being pending or not. Thus, one or more TCDs associated with one or more peripherals may indicate that the associated peripherals allow a less restrictive protection of direct memory access. Such peripheral may be referred to as a less restrictive peripheral. Hereto, the DMA controller DMA0 may, after having received the TCDs, be provided with such indication, and the DMA controller DMA0 may e.g. further establish the DONEn-flag, or the PDONEn-signal, to continuously indicate that no request is pending, to hereby never inhibit a direct memory access via the DONEn-flags to the less-restrictive peripheral. Alternatively, the DMA controller DMA0 may indicate in one of the ACR-bits in the bus interface AIPS or in an additional register in the AIPS that for the non-restrictive peripheral, access shall not be dependent on whether there is a pending request from the peripheral for a direct memory access service or not.

Figure 7:
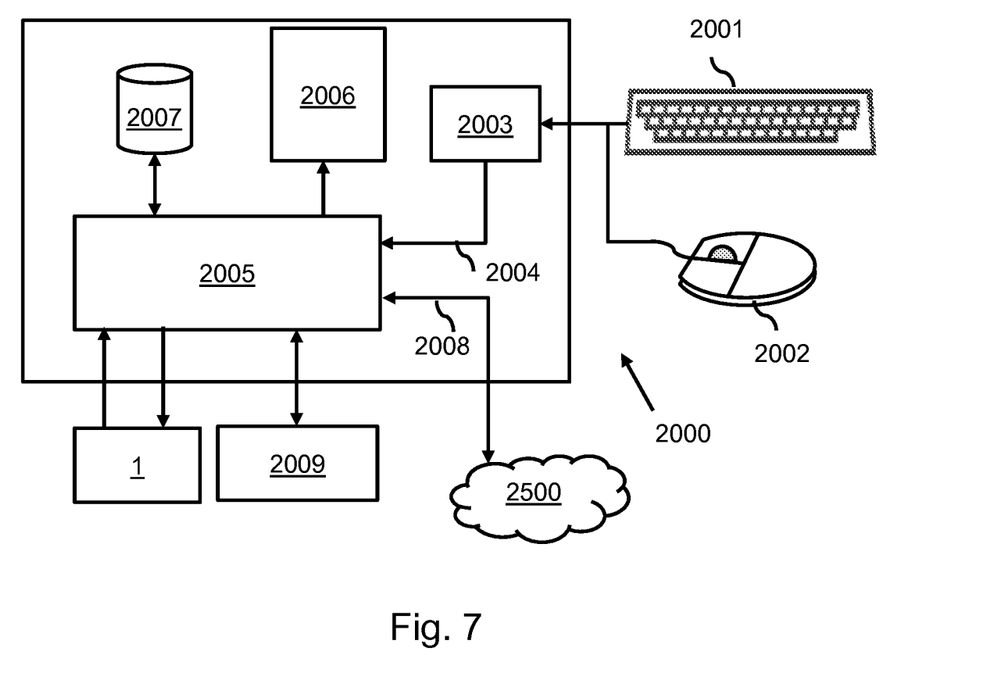
FIG. 7 schematically shows an exemplary user interaction system using an embodiment of a system.

FIG. 7 schematically shows an exemplary user interaction system 2000 having a programmable processor 2005. The user interaction system 2000 is shown to be a personal computer, but may be any type of suitable user interaction system 2000. The programmable processor 2005 is arranged to be able to communicate with a programmable target 1 as indicated. The programmable target 1 may for example be a microcontroller UC1 according to an embodiment as described with reference to FIG. 1 or another programmable device comprising or cooperating with one or more masters, one or more peripherals and an access control circuitry according to an embodiment. The user interaction system 2000 further comprises a storage unit 2007, a user input 2003 and a display 2006. The user input 2003 allows the user to input user data and user instructions 2004 to the processor 2005 by e.g. using a keyboard 2001 or a mouse 2002. Also, although not shown, the display 2006 may comprise a touch-sensitive surface for enabling the user to provide user data and user instructions to the user input 2003 by means of touching the display 2006. The processor 2005 is arranged to perform any one of the methods according to the invention, to receive user data and user instructions 2004, to present visual information on the display 2006 and to communicate with a data I/O device 2009, such as an optical disc drive or a solid state reader/writer. The processor 2005 is arranged to cooperate with the storage unit 2007, allowing storing and retrieving information on the storage unit 2007. The user interaction system 2000 may further comprise a communication channel 2008 allowing the processor 2005 to connect to an external cloud 2500 for communicating with other devices in the cloud. The external cloud may e.g. be the Internet. The processor 2005 may also be arranged to retrieve information from the storage unit 2007, or from another device in the cloud 2500, and generate the memory trace from combining the record of static memory address information and the record of dynamic memory address information offline by the processor 2005. The processor 2005 may be capable to read, using the data I/O device 2009, a computer readable medium comprising a program code 1 executable on a programmable target 2. The processor 2005 may be capable to read, using the data I/O device 2007, a computer readable medium comprising a computer program product comprising instructions for causing the system 1000 to perform a method of generating an instrumented code 13 from a program code 1 executable on the programmable target 2. The processor 2005 may be capable to read, using the data I/O device 2007, a computer readable medium comprising a computer program product comprising instructions for causing the system 1000 to perform a method of controlling direct memory access of a peripheral memory of a peripheral by a master according to any one embodiment.

Figure 8:
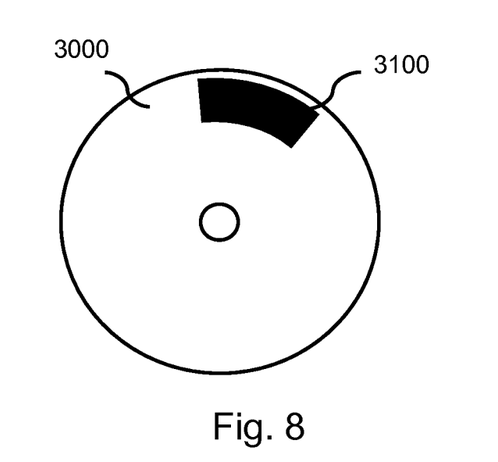
FIG. 8 shows an example of computer readable medium comprising a computer program product.

FIG. 8 shows a computer readable medium 3000 comprising a computer program product 3100, the computer program product 3100 comprising instructions for causing a processor apparatus to perform a method of controlling direct memory access of a peripheral memory of a peripheral by a master, according to an embodiment. The computer program product 3100 may be embodied on the computer readable medium 3000 as physical marks or by means of magnetization of the computer readable medium 3000. However, any other suitable embodiment is conceivable as well. Furthermore, it will be appreciated that, although the computer readable medium 3000 is shown in FIG. 8 as an optical disc, the computer readable medium 3000 may be any suitable computer readable medium, such as a hard disk, solid state memory, flash memory, etc., and may be non-recordable or recordable. The computer program product 3100 comprises instructions for causing a processor system to perform a method of controlling direct memory access of a peripheral memory of a peripheral by a master, the method comprising checking whether there is a pending request (DMAREQ0) from the peripheral for a direct memory access service, establishing whether an access condition is satisfied in dependence on at least whether there is a pending request, and if the access condition is satisfied, granting access to the master (CPU0). In further embodiments, the computer program product 3100 comprises instructions for causing a processor system to perform any further embodiments of the method, such as if the access condition is not satisfied, denying access to the master. Also, for example, the computer program product 3100 may further comprise instructions for causing a processor system to perform a method wherein checking whether there is a pending request from the peripheral for a direct memory access service comprises checking whether the peripheral made a request for the direct memory access service and checking whether the direct memory access service requested by the peripheral has not yet been completed.

An operating system (OS) is the software that manages the sharing of the resources of a computer and provides programmers with an interface used to access those resources. An operating system processes system data and user input, and responds by allocating and managing tasks and internal system resources as a service to users and programs of the system.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-ROM or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

As used herein, the term "bus" is used to refer to a plurality of signals or conductors which may be used to transfer one. The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of UC1 are circuitry located on a single integrated circuit or within a same device. Alternatively, system UC1 may include any number of separate integrated circuits or separate devices interconnected with each other. For example, a timer may be located as one of the peripherals on a same integrated circuit as master CPU0 or on a separate integrated circuit or located within another peripheral or slave discretely separate from other elements of system UC1. Peripherals PER1, PER2 and PER3 may form I/O circuitry such as a CAN-bus interface, a LIN-bus interface and/or General Purpose I/O, and may also be located on separate integrated circuits or devices. Also for example, system UC1 or portions thereof may be soft or code representations of physical circuitry or of logical representations convertible into physical circuitry. As such, system UC1 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system UC1 or UC2, for example, from computer readable media such as memory 3000 or other media on other computer systems. Such computer readable media may be permanently, removably or remotely coupled to an information processing system such as system 2000. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 2000 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, Also, devices functionally forming separate devices may be integrated in a single physical device. Also, the units and circuits may be suitably combined in one or more semiconductor devices. For example, one of the peripherals may be a CAN-bus interface CAN_IF which may be combined in a single semiconductor device with, for example, the masters CP, or, alternatively, be distributed over multiple semiconductor devices. As another example, another peripheral may be part of microcontroller UC1, or an external device connected to and cooperating with the microcontroller UC1.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of controlling direct memory access of a peripheral memory of a peripheral by a master, the method comprising:
    checking whether there is a pending request from the peripheral for a direct memory access service;
    establishing whether an access condition is satisfied in dependence on at least whether there is a pending request;
    if the access condition is satisfied, granting access to the master; and
    establishing an indicator to indicate that a request is pending upon receiving a request from the peripheral for a direct memory access service and establishing the indicator to indicate that the request is no longer pending upon completion of the direct memory access service,
    wherein checking whether there is a pending request from the peripheral for a direct memory access service comprises receiving a request from the peripheral for a direct memory access service and latching the request until a latch reset is performed.

2. A method according to claim 1, further comprising, if the access condition is not satisfied, denying access to the master.

3. A method according to claim 1, wherein checking whether there is a pending request from the peripheral for a direct memory access service comprises checking whether the peripheral made a request for the direct memory access service and checking whether the direct memory access service requested by the peripheral has not yet been completed.

4. A method according to claim 1, further comprising performing the latch reset after an execution of the direct memory access service associated with the request has been completed.

5. A method according to claim 4, wherein performing the latch reset is performed by the indicator changing from indicating that a request is pending to indicating that the request is no longer pending.

6. A method according to claim 1, wherein the indicator is established by a direct memory access controller.

7. A method according to claim 1, the method further comprising: establishing a master ID associated with the master; and comparing the master ID with one or more pre-established master IDs to obtain a master comparison result, the one or more pre-established master IDs indicating masters allowed to access the peripheral, wherein establishing whether the access condition is satisfied is performed in further dependence on at least the master comparison result.

8. A method according to claim 7, wherein establishing the master ID comprises receiving the master ID from the master.

9. A method according to claim 7, wherein the master is one of a plurality of bus masters and, if the access condition is satisfied, access is exclusively granted to the master.

10. A circuitry comprising one or more masters; a direct memory access controller; one or more peripherals with associated peripheral memories; and an access control circuitry associated with the one or more peripherals, the direct memory access controller and the access control circuitry being arranged to control direct memory access of a peripheral memory of a peripheral of the one or more peripherals by a master of the one or more masters in dependence on at least a direct memory access request from the peripheral, the control comprising:
    checking whether there is a pending request from the peripheral for a direct memory access service,
    establishing whether an access condition is satisfied in dependence on at least whether there is a pending request, and
    if the access condition is satisfied, granting access to the master, the access control circuitry being arranged to, in checking whether there is a pending request from the peripheral for a direct memory access service, check whether the peripheral made a request for the direct memory access service and check whether the direct memory access service requested by the peripheral has not yet been completed, and
    the direct memory access controller being arranged to establish an indicator to indicate that a request is pending upon receiving a request from the peripheral for a direct memory access service and establish the indicator to indicate that the request is no longer pending upon completion of the direct memory access service, and the access control circuitry being arranged to receive the indicator for using the indicator to check whether there is a pending request from the peripheral for a direct memory access service.

11. A circuitry according to claim 10, the direct memory access controller and the access control circuitry arranged to
   check whether there is a pending request from the peripheral for a direct memory access service,
   establish whether an access condition is satisfied in dependence on at least whether there is a pending request, and
   if the access condition is satisfied, grant access to the master.

12. A circuitry according to claim 10, the access control circuitry comprising a logical AND circuit and a logical NOT circuit, the logical NOT circuit being arranged to receive the indicator as established by the direct memory access controller on its input and to provide an NOT-version of the indicator on its output, and the logical AND circuit being arranged to receive a request from the peripheral for a direct memory access and the NOT-version of the indicator on its inputs so as to obtain an indicator of an active pending request on its output.

13. A circuitry according to claim 10, the access control circuitry being further arranged to establishing a master ID associated with the master and to compare the master ID with one or more pre-established master IDs to obtain a master comparison result, the one or more pre-established master IDs indicating masters allowed to access the peripheral, wherein establishing whether the access condition is satisfied is performed in further dependence on at least the master comparison result.

14. A device comprising a circuitry according to claim 10.

15. A device according to claim 14, the device comprising a microcontroller.

* * * * *